(12) United States Patent
Buechin et al.

(10) Patent No.: US 12,341,549 B2
(45) Date of Patent: Jun. 24, 2025

(54) PROTECTIVE COVER FOR AN ELECTRONIC READING DEVICE

(71) Applicant: RAKUTEN KOBO INC., Toronto (CA)

(72) Inventors: Anna Buechin, Toronto (CA); Archer Wun, Toronto (CA); CheYu Lin, Toronto (CA); KuanChang Lin, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 373 days.

(21) Appl. No.: 17/939,977

(22) Filed: Sep. 8, 2022

(65) Prior Publication Data

US 2024/0088931 A1  Mar. 14, 2024

(51) Int. Cl.
*H04B 1/3888* (2015.01)
*G06F 1/16* (2006.01)
*G06F 3/0354* (2013.01)

(52) U.S. Cl.
CPC ......... *H04B 1/3888* (2013.01); *G06F 1/1626* (2013.01); *G06F 3/03545* (2013.01)

(58) Field of Classification Search
None
See application file for complete search history.

(56) References Cited

U.S. PATENT DOCUMENTS

2017/0248999 A1\* 8/2017 Ng ......................... H01R 31/06
2018/0138937 A1\* 5/2018 Richardson ............ H05K 5/068

\* cited by examiner

*Primary Examiner* — Frantz Bataille
(74) *Attorney, Agent, or Firm* — XSENSUS LLP

(57) ABSTRACT

A protective cover for an electronic device comprising a connection portion configured to be attached to the electronic device to secure the protective cover to the electronic device; a stylus storage portion adjacent to the connection portion; and a flap portion connected to the stylus storage portion by a flexible hinge portion. The connection portion includes a plurality of magnets in a predetermined arrangement, wherein the connection portion is configured to be magnetically coupled to the electronic device when the protective cover is attached to the electronic device. The predetermined arrangement is configured to align with another plurality of magnets embedded in a honeycomb structure of the electronic device such that each of the another plurality of magnets is disposed in a respective honeycomb of the honeycomb structure.

16 Claims, 5 Drawing Sheets

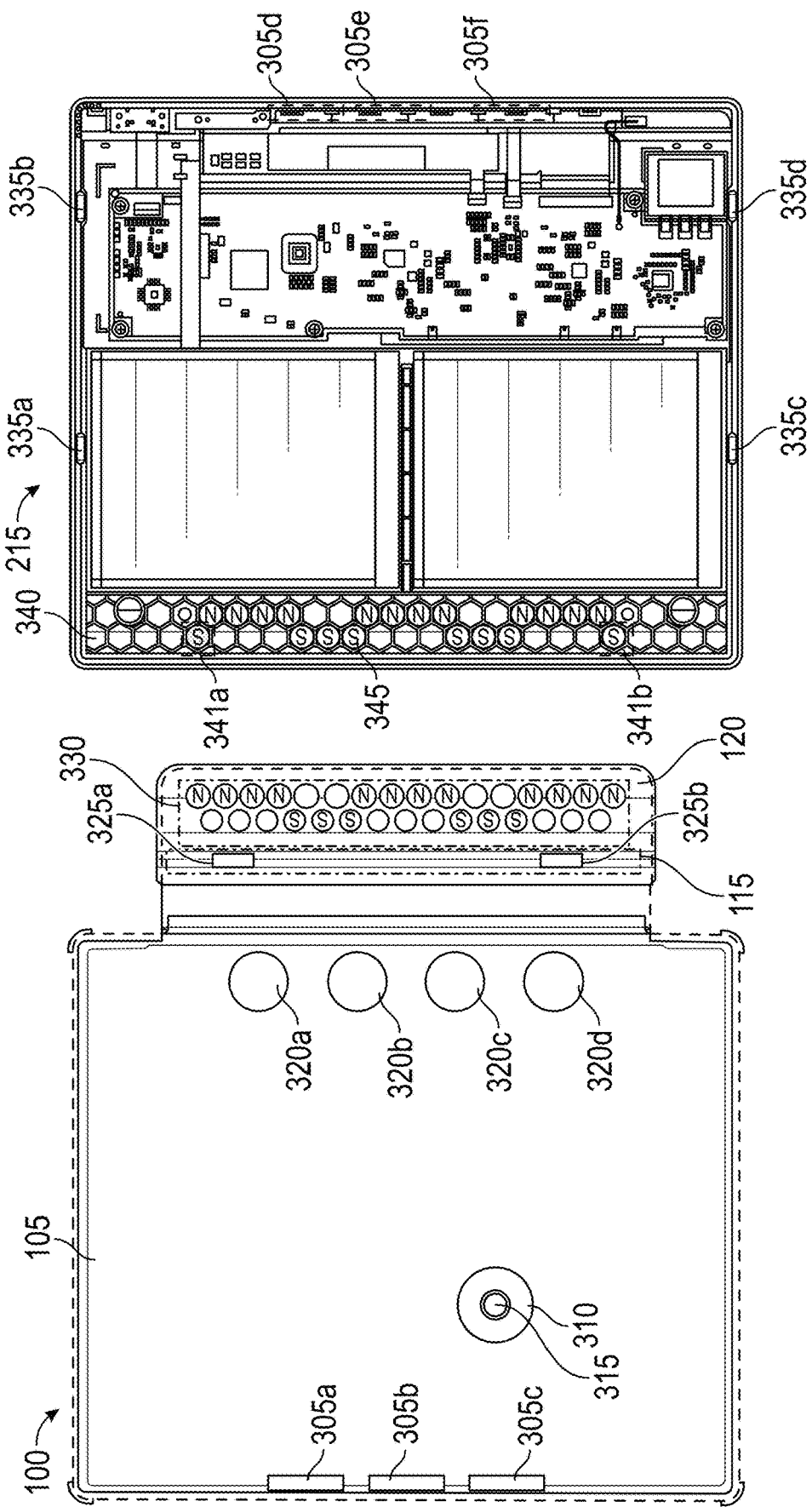

PROTECTIVE COVER FOR AN ELECTRONIC READING DEVICE

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile computing devices, such as laptops, PDAs, media players, game consoles, touchpads, smartphones, e-readers etc., have evolved to become more and more sophisticated. With the rapidly developing technologies on Internet data storage, data transmission, and wireless communication as well as on data-handling capabilities of mobile computing devices, consumers increasingly spend extended time using such devices, such as watching videos, viewing photos, video conferencing, reading books, Internet browsing, sending emails, on-line chatting, playing video games, etc. To suit consumers' demand for portability, the design trend of various mobile computing devices continues to emphasize making the devices smaller and thinner. Most modern portable computing devices are installed with a touchscreen panel that is fixed to the device body. Additionally, many modern portable computing devices are compatible with a stylus. External accessories of various configurations are typically used to protect the mobile computing device. Some of the accessory products include a protective case and/or cover customized for a device model.

SUMMARY

According to aspects of the disclosed subject matter, a protective cover for an electronic device comprising a connection portion configured to be attached to the electronic device to secure the protective cover to the electronic device; a stylus storage portion adjacent to the connection portion; and a flap portion connected to the stylus storage portion by a flexible hinge portion. The connection portion includes a plurality of magnets in a predetermined arrangement, wherein the connection portion is configured to be magnetically coupled to the electronic device when the protective cover is attached to the electronic device. The predetermined arrangement is configured to align with another plurality of magnets embedded in a honeycomb structure of the electronic device such that each of the another plurality of magnets is disposed in a respective honeycomb of the honeycomb structure.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3A depicts a transparent back view of a protective cover including placement of various magnets according to one or more aspects of the disclosed subject matter;

FIG. 3B depicts a back view of various internal components of an electronic reading device according to one or more aspects of the disclosed subject matter.

DETAILED DESCRIPTION

Figure 1:
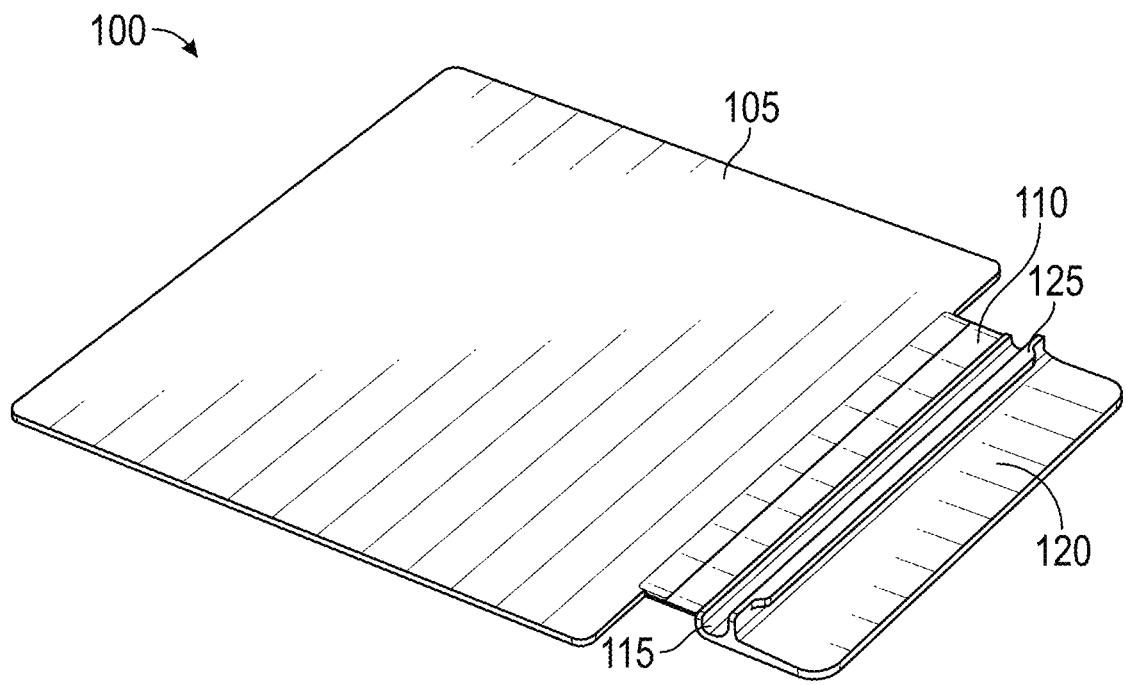
FIG. 1 illustrates an exemplary overview of a protective cover according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views:

Generally, provided herein is a mobile computing device protective cover having a foldable hinge around which a flap portion of the protective case can rotate, and the protective cover can detachably connect to a mobile computing device.

FIG. 1 illustrates an exemplary overview of a protective cover 100 according to one or more aspects of the disclosed subject matter. The protective cover 100 can be a cover designed as an accessory for a mobile computing device (e.g., hereinafter also referred to as an electronic reading device). The cover may serve as a front cover, for example, to protect the display screen of the computing device in a covered position. The protective cover 100 can include a flap portion 105, a folding hinge 110 positioned between the flap portion 105 and a stylus storage portion 115, a connection portion 120, and the connection portion can include a lip portion 125. The flap portion 105 can be rotated about the folding hinge 110 between a fully closed position and a fully open position. For example, the fully closed position corresponds to the flap 105 being in contact with a front surface of the mobile computing device to which the cover is connected, and the fully open position corresponds to the flap portion 105 being in contact with a back surface of the mobile computing device (e.g., FIG. 4). For reference, the fully closed position can be also be referred to as the flap portion 105 being at 0° and the fully open position can also be referred to as the flap portion 105 being at 360°.

More specifically, the stylus storage portion 115 can be shaped to receive a stylus. For example, the stylus storage portion 115 can have an open semi-circular storage area configured to receive an at least substantially cylindrical stylus. It should be appreciated that the stylus storage portion 115 and/or the stylus can be other shapes so long as the stylus storage portion 115 can receive the stylus so that the stylus can be detachably connected to the stylus storage area 115 via magnets as further described herein.

The protective cover and the associated components may be manufactured by any suitable processes and materials that are well known in the art. In one aspect, the flap 105 may primarily be a rigid and non-foldable panel. For example, the flap 105 may be made of soft materials (for exterior and interior surfaces) covering one or more rigid panels or reinforcement structures. The soft materials may include one or more of polyurethane (PU) laminate, neoprene, silicone, microfiber cloth, leather, rubber, vinyl, polyvinyl chloride (PVC), plastic, etc. The reinforcement structure may include one or more of stiff polycarbonate (PC) or other plastic, wood, metal, etc. Additionally, one or more magnets may be installed (e.g., embedded) in the protective cover and/or the electronic reading device such that various interactions occur by force of the magnets between the protective cover and the electronic reading device.

The folding hinge area (e.g., the folding hinge 110) may include only the soft materials and lack a reinforcement structure. In an embodiment, the upper portion and the lower portion of a front cover may have different materials in their respective reinforcement structures, for instance an EVA foam sheet for the lower portion and polycarbonate for the upper portion.

Figure 2A:
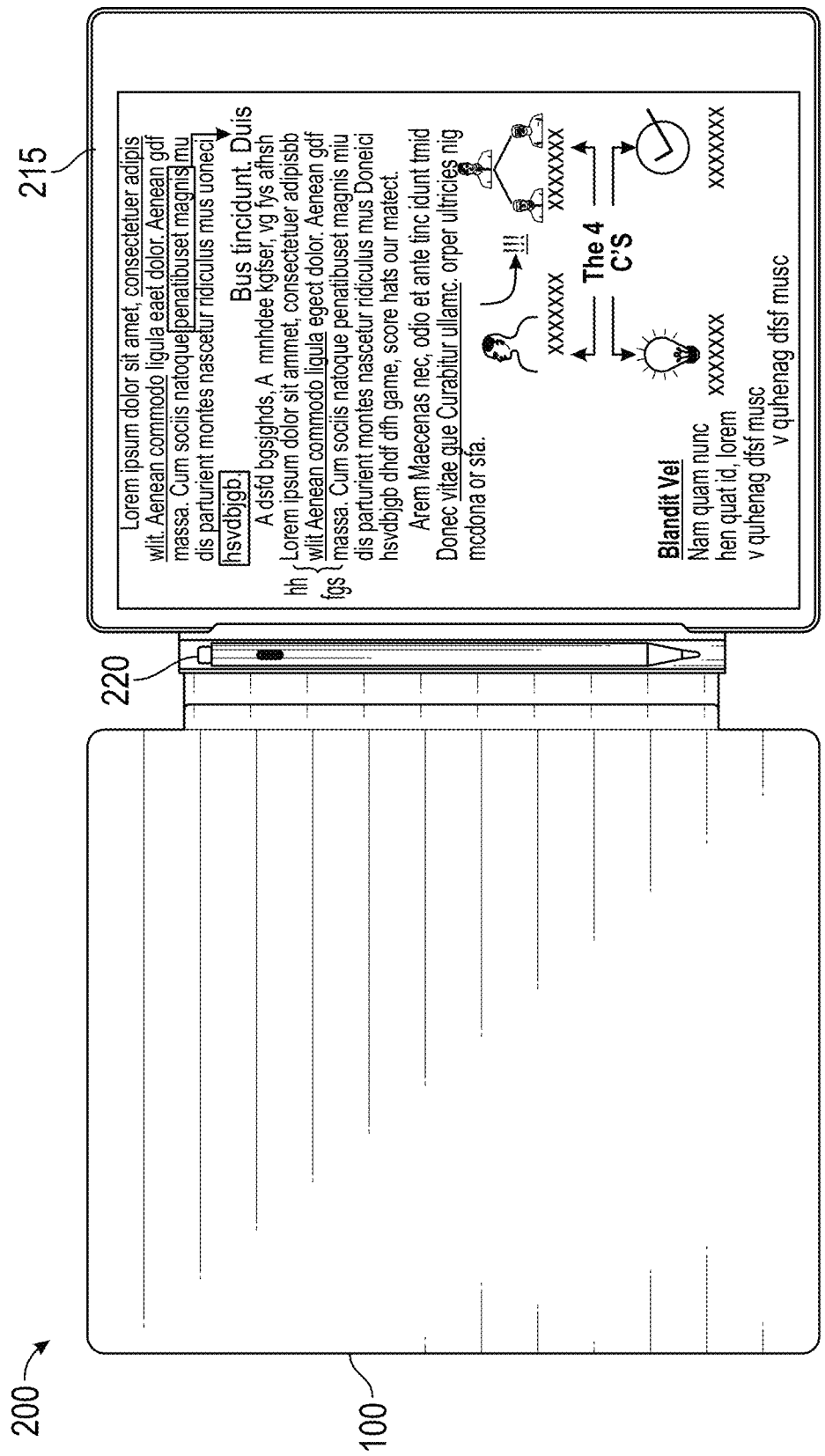
FIG. 2A depicts an exemplary overview of an electronic reading device with a protective cover according to one or more aspects of the disclosed subject matter.

FIG. 2A depicts a front view of an exemplary system 200 including an electronic reading device 215 with a protective cover (e.g., protective cover 100) in an open position according to one or more aspects of the disclosed subject matter. Additionally, FIG. 2 illustrates a stylus 220 being stored in a stylus storage portion (e.g., the stylus storage portion 115).

The electronic reading device 215 can be detachably connected to the protective cover 100 via magnetic coupling between magnets in the connection portion 120 and magnets embedded in the electronic reading device 215 as further described herein, and the protective cover 100 can be further secured to the electronic reading device 215 by the lip portion 125. For example, the lip portion 125 can prevent inadvertent detachment of the protective cover 100 from the electronic reading device 215 caused by the momentum and weight of the flap portion 105 being opened and rotated around the electronic reading device 215. The protective cover 100 detachably connects to the electronic reading device by magnetically coupling the connection portion 120 to a back surface of the electronic reading device 215 and clipping the connection portion 120 to the electronic reading device 215 via the lip portion 125 that extends over the front surface of the electronic reading device 215.

Figure 2B:
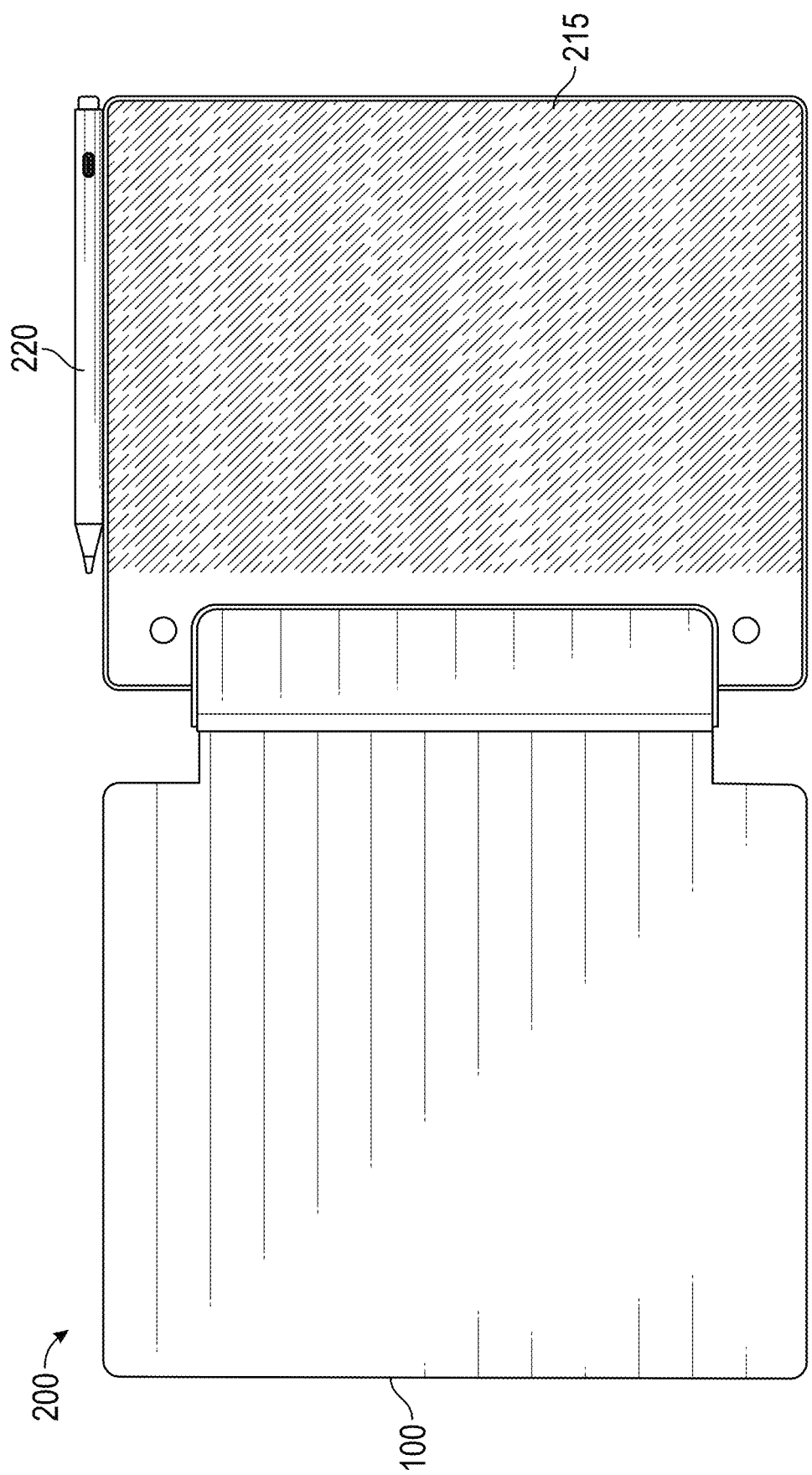
FIG. 2B depicts a back view of a protective cover in an open position according to one or more aspects of the disclosed subject matter.

FIG. 2B depicts a back view of an exemplary system 200 including an electronic reading device 215 with a protective cover (e.g., protective cover 100) in an open position according to one or more aspects of the disclosed subject matter. Additionally, FIG. 2 illustrates the stylus 220 detachably connected to an edge portion of the electronic reading device 215. In one aspect, the stylus 220 is detachably connected to an edge of the electronic reading device 215 via magnets as further described herein.

FIG. 3A depicts a transparent back view of a protective cover (e.g., protective cover 100) including placement of various magnets according to one or more aspects of the disclosed subject matter. FIG. 3B depicts a back view of various internal components of an electronic device (e.g., electronic reading device 215) according to one or more aspects of the disclosed subject matter. Referring to FIGS. 3A and 3B, the flap portion 105 includes protective cover closing magnets 305a, 305b, 305c; a Hall sensor magnet 315 and a magnet shielding 310; and metal plates 320a, 320b, 320c, 320d. The stylus storage portion 115 includes stylus holder magnets 325a, 325b. The connection portion 120 includes a plurality of magnets 330, each of the plurality of magnets 330 having a predetermined position embedded in the connection portion 120. The electronic reading device 215 includes device closing magnets 305d, 305e, and 305f; a Hall sensor; a honeycomb structure 340; and a plurality of magnets 345 embedded in predetermined positions in the honeycomb structure 340.

The device closing magnets 305d, 305e, 305f can be positioned in a predetermined location within the electronic reading device 215 such that the protective cover closing magnets 305a, 305b, 305c can be configured to magnetically connect with the device closing magnets 305d, 305e, 305f when the flap portion 105 of the protective cover 100 is in a closed position (e.g., the flap portion 105 of the protective case 100 is in contact with a front surface of the electronic reading device 215), for example. Similarly, the Hall sensor can be positioned in a predetermined location within the electronic reading device 215 such that the Hall sensor magnet 315 interacts with the Hall sensor when the protective cover 100 is in the closed position. The predetermined positioning of the Hall sensor and the Hall sensor magnet 315 allows the electronic reading device 215 to enter a sleep mode. More specifically, the interaction between the Hall sensor and the Hall sensor magnet 315 can be configured to cause the Hall sensor magnet 315 to trigger the Hall sensor which can cause the electronic reading device 215 to enter a sleep mode.

Additionally, the magnet shielding 310 can be positioned in the flap portion 105 of the protective cover 100 and between the Hall sensor magnet 315 and the electronic reading device 215. The magnet shielding 310 can be positioned between the Hall sensor magnet 315 and the electronic reading device 215 to prevent the Hall sensor magnet 315 from interacting with the Hall sensor and causing the electronic reading device 215 to enter a sleep mode at an unintended time. In other words, the magnet shielding 310 can prevent the Hall sensor magnet 315 from triggering the Hall sensor when the flap portion 105 of the protective cover 100 is folded behind the electronic reading device 215 (e.g., FIG. 4).

Returning to discussion of the plurality of metal plates 320a, 320b, 320c, 320d, each of the plurality of metal plates can be disposed in a predetermined location. For example, each of the metal plates 320a, 320b, 320c, 320d can be positioned in a predetermined location of the protective case 100 such that each of the metal plates can interact with the plurality of magnets 330 in the connection portion 120 when the flap portion 105 of the protective cover 100 is folded behind the electronic reading device 215 (e.g., FIG. 4).

Each of the stylus holder magnets 325a, 325b can be disposed in a predetermined location in the protective cover 100. For example, each of the stylus holder magnets 325a, 325b can be positioned in a predetermined location in the stylus storage portion 115 such that the stylus can be detachably secured in the stylus storage portion 115 via the stylus holder magnets 325a, 325b.

Regarding detachably connecting the protective cover 100 to the electronic reading device, the system 200 can include the plurality of magnets 330 being arranged in predetermined positions to align with corresponding magnets of the magnets 345 disposed in predetermined honeycombs of the honeycomb structure 340. For example, the plurality of magnets 330 can be arranged in two columns where a left column corresponds to a column closer to the stylus storage portion 115 as illustrated in FIG. 3A and a right column corresponds to the column to the right of the left column as illustrated in FIG. 3A. Additionally, the columns can be staggered in a vertical direction so that the arrangement of the plurality of magnets 330 mirrors the honeycomb structure 340. Further, in one aspect, the magnets of the plurality of magnets 330 positioned in the left column are configured such that a south pole of the magnet is visible in the transparent back view of the protective case 100 as illustrated in FIG. 3A and the magnets of the plurality of magnets 330 positioned in the right column are configured such that a north pole of the magnet is visible in the transparent back view of the protective case 100 as illustrated in FIG. 3A. In other words, in the left column, the south pole of the magnet is closer to a surface of the connection portion that does not directly contact the electronic reading device 215 when the protective cover 100 is attached to the electronic reading device 215. However, it should be appreciated that the left column could have magnets configured with the north pole of the magnet closer to the surface of the connection portion that does not directly contact the electronic reading device 215 as long as the magnets in the right column are opposite (i.e., south pole of the magnet closer to the surface of the connection portion that does not directly contact the electronic reading device 215).

Additionally, the direction of the polarity of the magnets 330 in the left column and the right column can depend on the orientation of the magnets 345 in the honeycomb structure 340 in the electronic reading device 215. For example, if the magnets 330 in the left column have the south pole of the magnet closer to a surface of the connection portion that does not directly contact the electronic reading device 215, then a "left column" of the honeycomb structure 340 will also have magnets 345 configured to have an orientation such that the south pole of the magnet is closer to a back surface of the electronic reading device 215. For example, the left column in the honeycomb structure 340 can correspond to a column of the honeycomb structure 340 that is closer to a left edge of the electronic reading device 215 as illustrated in FIG. 3B. Similarly, a "right column" of the honeycomb structure 340 will have magnets 345 configured to have an orientation such that the north pole of the magnet is closer to a back surface of the electronic reading device 215. In summary, the orientation of the magnets in the left column of the connection portion 120 will be the same as the magnets in the left column of the honeycomb structure 340 of the electronic reading device 215, and the orientation of the magnets in the right column of the connection portion 120 will be the same as the magnets in the right column of the honeycomb structure 340 of the electronic reading device 215. This arrangement of the magnets 330 and the magnets 345 allows for an easy and secure connection between the protective case 100 and the electronic reading device 215 via the connection portion 120.

Further, as can be seen in the illustration in FIG. 3B, there are two extra magnets 341a and 341b in the left column of the honeycomb structure 340 compared to the left column of the magnets 330 in the connection portion 120. These two magnets of the magnets 345 are strategically positioned such that they do not have a corresponding magnet in the magnets 330. For example, one of the extra magnets of the magnets 345 is positioned in honeycomb 341a and the other of the extra magnets of the magnets 340 is positioned in honeycomb 341b. As a result, when a user attempts to the connect the protective case 100 to the electronic reading device 215, the extra magnets disposed in honeycomb 341a and 341b guide the connection portion 120 to a position where the magnets 330 align with the magnets 340 (other than the magnets 340 in the honeycomb 341a and 341b). In other words, even if the connection portion is not perfectly aligned with the magnets 340 when a user initially attempts to connect the protective case 100 to the electronic reading device 215, the magnets 340 disposed in the honeycomb 341a and 341b guide the connection portion 120 to the correct alignment so that the connection portion 120 "snaps" into place and creates a secure magnetic connection with the electronic reading device 215.

Figure 4:
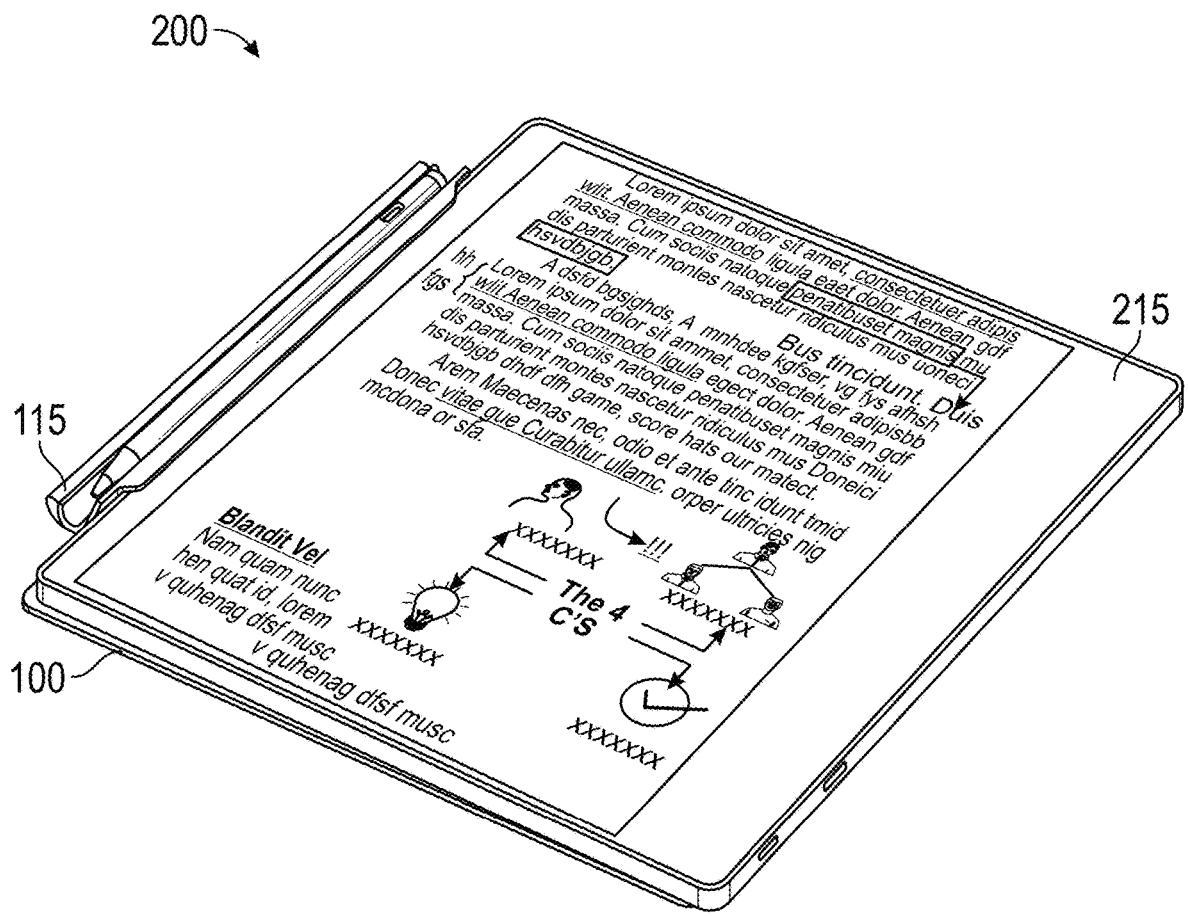
FIG. 4 depicts a front view of a protective cover attached to an electronic reading device and the protective cover is folded behind the electronic reading device according to one or more aspects of the disclosed subject matter.

FIG. 4 depicts a front view of a protective cover (e.g., the protective cover 100) attached to an electronic reading device (e.g., the electronic reading device 215) and the protective cover 100 is folded behind the electronic reading device 215 according to one or more aspects of the disclosed subject matter. Additionally, it can be seen in FIG. 4 that the folding hinge 110 is made of a flexible material that wraps around the stylus storage portion 115 when being rotated into a position where the flap portion 105 of the protective cover 100 is folded behind the electronic reading device 215. In this position, the stylus storage portion 115 is still accessible so that a user can conveniently access the stylus (e.g., stylus 200). While the magnets 335a-d embedded in the electronic reading device 215 as illustrated in FIG. 4B provide an easy storage location for certain scenarios (e.g., actively working and temporarily storing the stylus), the stylus storage portion 115 provides an additional and more secure storage option (e.g., while the electronic reading device is being transported (e.g., in a backpack, briefcase, etc.). Additionally, because the metal plates 320a-320d secure the flap portion 105 in place when the protective cover 100 is folded behind the electronic reading device 215 as illustrated in FIG. 4, the flap portion 105 does not get in the user's way unintentionally while the user is interacting with the electronic reading device 215.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A protective cover, comprising:
a connection portion including a rigid panel structure and configured to be attached to an electronic device, wherein the connection portion includes a plurality of magnets arranged in two staggered columns, wherein magnets in a first column are oriented with a first pole facing a first direction and magnets in a second column are oriented with a second pole facing the first direction, and wherein the plurality of magnets are configured to align with corresponding magnets disposed in a honeycomb structure of the electronic device;
a stylus storage portion adjacent to the connection portion; and
a flap portion connected to the stylus storage portion by a flexible hinge portion,
wherein the connection portion includes a protruding lip structure extending from an edge of the rigid panel structure and configured to extend over a front surface of the electronic device.

2. The protective cover according to claim 1, wherein the connection portion includes the plurality of magnets embedded in the rigid panel structure of the connection portion, wherein the connection portion is configured to be magnetically coupled to the electronic device when the protective cover is attached to the electronic device.

3. The protective cover according to claim 1, wherein the protruding lip structure of the connection portion is further configured to prevent inadvertent detachment of the protective cover from the electronic device.

4. The protective cover according to claim 1, wherein the flap portion includes a Hall sensor magnet positioned on top of a magnet shielding, wherein the Hall sensor magnet is positioned between the magnet shielding and a back surface of the electronic device when the protective cover is in a closed position.

5. The protective cover according to claim 2, wherein the flap portion includes a plurality of metal plates, wherein the plurality of metal plates are configured to be magnetically coupled with the plurality of magnets embedded in the connection portion to secure the flap portion behind the electronic device when the flap portion is folded behind the electronic device.

6. The protective cover according to claim 1, wherein the magnet shielding is configured to prevent the Hall sensor magnet from triggering a Hall sensor disposed in the electronic device when the flap portion is folded behind the electronic device.

7. The protective cover of claim 1, wherein the Hall sensor magnet is positioned at a position of the flap portion that corresponds to a position of a Hall sensor in the electronic device.

8. The protective cover of claim 7, wherein the Hall sensor magnet is configured to trigger the Hall sensor when the front cover is in a closed position.

9. The protective cover of claim 1, wherein the electronic device is configured to enter a sleep mode in response to the Hall sensor magnet triggering the Hall sensor.

10. The protective cover of claim 1, wherein the flap portion includes a plurality of protective cover closing magnets disposed in the protective cover configured to be magnetically coupled to device closing magnets disposed in the electronic device when the protective cover is in a closed position.

11. A system, comprising:
an electronic device, wherein the electronic device includes a honeycomb structure having a plurality of magnets disposed therein; and
a protective cover including
a connection portion including a rigid panel structure and configured to be attached to the electronic device, wherein the connection portion includes a plurality of magnets arranged in two staggered columns, wherein magnets in a first column are oriented with a south pole facing a first direction and magnets in a second column are oriented with a north pole facing the first direction, and wherein the plurality of magnets are configured to align with the plurality of magnets disposed in the honeycomb structure of the electronic device;
a stylus storage portion adjacent to the connection portion; and
a flap portion connected to the stylus storage portion by a flexible hinge portion,
wherein the connection portion includes a protruding lip structure extending from an edge of the rigid panel structure and configured to extend over a front surface of the electronic device.

12. The system of claim 11, wherein the connection portion includes the first plurality of magnets embedded in the connection portion, wherein the connection portion is configured to be magnetically coupled to the electronic device when the protective cover is attached to the electronic device.

13. The system of claim 12, wherein the electronic device includes a second plurality of magnets, wherein each of the second plurality of magnets is disposed in a respective honeycomb of the honeycomb structure.

14. The system of claim 13, wherein an arrangement of each of the first plurality of magnets in the staggered columns is configured to align with the second plurality of magnets embedded in the honeycomb structure of the electronic device.

15. The system of claim 11, wherein the flap portion includes a Hall sensor magnet positioned on top of a magnet shielding, wherein the Hall sensor magnet is positioned between the magnet shielding and a back surface of the electronic device when the protective cover is in a closed position.

16. The protective cover of claim 1, wherein the first column includes a first predetermined number of magnets and the second column includes a second predetermined number of magnets, the first predetermined number of magnets being different than the second predetermined number of magnets.

* * * * *